July 27, 1926.
C. A. BORNMANN
1,593,687
PHOTOGRAPHIC SHUTTER
Filed Feb. 16, 1926
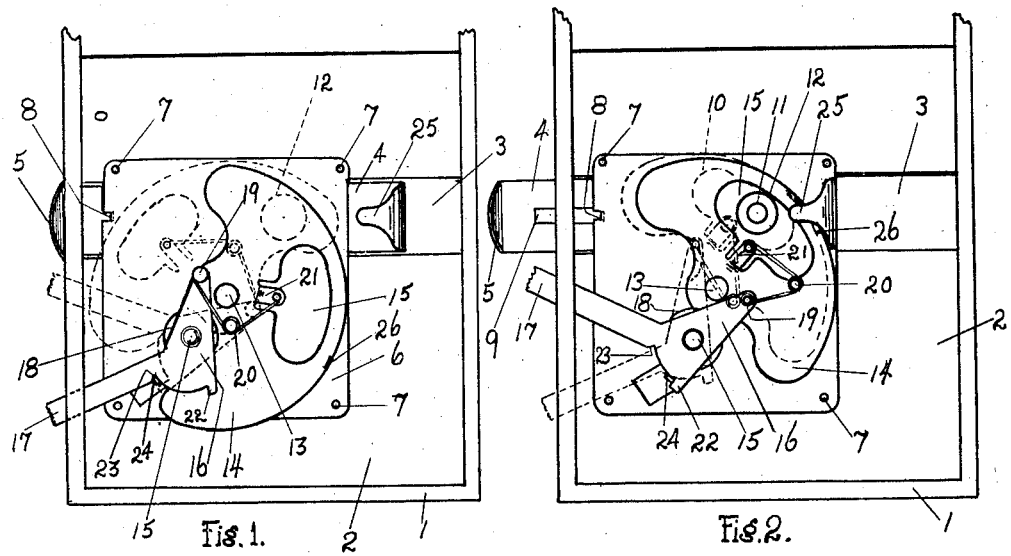
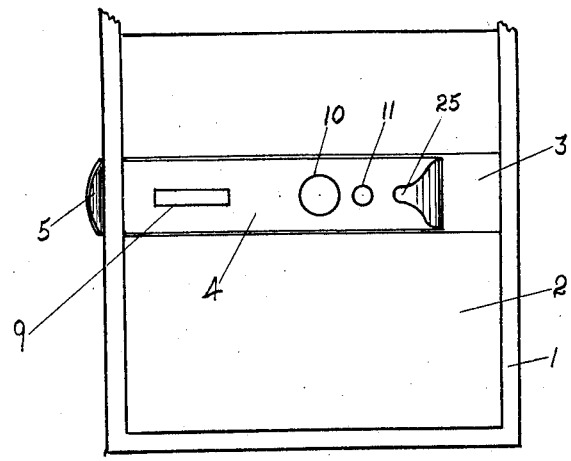
INVENTOR
CARL A. BORNMANN.
BY Philip S. Hopkins
ATTORNEY Patented July 27, 1926.

1,593,687

UNITED STATES PATENT OFFICE.

CARL A. BORNMANN, OF BINGHAMTON, NEW YORK, ASSIGNOR TO ANSCO PHOTO-PRODUCTS, INC., OF BINGHAMTON, NEW YORK.

PHOTOGRAPHIC SHUTTER.

Application filed February 16, 1926. Serial No. 88,594.

My invention relates to shutters for photographic cameras, and particularly to the box type of camera. The principal object of my invention is to provide such a shutter, whereby when the same is set or regulated for a "time" exposure, the effective diaphragm aperture of the shutter will be relatively smaller than when the same is set for "instantaneous" exposure.

Another object is to combine the diaphragm containing the relatively large and small apertures with the means for detaining the blade or leaf of the shutter in operative position to make a "time" exposure.

A still further object is to provide a novel means for retaining and guiding the combined diaphragm, and "time" exposure operating means within the camera.

Other objects and advantages in details of construction and operation will be apparent as the description proceeds, reference being had to the accompanying drawing wherein like reference numerals indicate like parts.

Figure 1 is a diagrammatic end view of the camera with my improved shutter secured thereto, and the parts shown in position for an "instantaneous" exposure.

Figure 2 is a similar view illustrating the parts in position for a "time" exposure.

Figure 3 is a detail view illustrating the combined diaphragm and "time" exposure operating means.

The reference numeral 1 indicates generally the outline of a conventional type of box camera in front elevation and with the front board containing the usual lens removed for clearness in illustration.

A shutter block 2 forms a support across the front of the camera, and as shown, is provided with a lateral groove or recess 3, in which is mounted a slidable diaphragm member 4. One end of this slidable diaphragm projects through one side of the camera, and is offset slightly as at 5 to provide a finger hold, whereby the diaphragm may be slid out and in with respect to the camera. A shutter plate 6 is secured to the support 2 by screws or other suitable means 7, and as shown clearly in Figures 1 and 2, the upper side of the plate 6 overlies the groove 3. The sliding diaphragm 4 therefore is movable back and forth within the groove 3 directly beneath the shutter plate 6. One edge of the shutter plate 6 has a downwardly turned finger 8, preferably struck from the plate and extending into an elongated slot or recess 9, running longitudinally of the sliding diaphragm 4. This arrangement determines and limits the sliding movement of the diaphragm 4. It further acts as a guide for the diaphragm in its movement in the recess 3.

The diaphragm 4 is provided intermediate its ends with two circular openings 10 and 11, the former being a relatively large opening for "instantaneous" exposures, and the latter a relatively small aperture for "time" exposures. These apertures are so arranged on the diaphragm as to be selectively brought directly beneath an opening 12 shown in dotted lines in Figure 1, located in the shutter plate 6. This opening 12, of course, overlies the usual opening through the block 2 of the camera, and in alignment with the usual lens in the front of the camera (not shown).

Pivoted centrally of the supporting shutter plate 6, as at 13, is the shutter leaf 14, provided with an opening 15, adapted to pass over and uncover the opening 12, as the leaf is operated to make an exposure. Also pivoted to the shutter plate 6, as at 15, is an operating lever 16, having one end 17 thereof, projecting through the side of the camera, whereby the same may be manipulated. A spacing washer 18 is placed between the operating lever 16 and the shutter plate 6 thus bringing the plane of the operating lever above that of the shutter leaf 14. The edges of the spacer washer 18 serve as a stop against which the edges of the shutter leaf may engage as the same is thrown from one position to another. The inner end of the lever 16 is provided with an upstanding pin 19 to which is attached one end of a coil spring 20, the other end of which engages an upstanding lug 21 bent upwardly from the leaf 14.

From this construction, it will be obvious that as the operating lever 16 is manipulated by the end 17, the spring 20 will act to swing the leaf 14 backward or forward, as shown clearly in full and dotted lines in Figure 1, and during such movement, the opening 15 uncovers the aperture 12 in the shutter plate 6. As shown, the shutter lever 16 is provided with shoulders 22 and 23 engageable with an upstanding ear 24 struck from the shutter plate 6. This construction limits the movements of the operating lever 16. The operation of the construction just described will be apparent, for as the shutter lever 16 has moved upwardly or downwardly, and as it passes its central point in the arc of its swing, the tension of the spring 20 will be exerted to throw the shutter leaf 14 in one direction or the other, depending upon the direction of manipulation of the lever 16.

It will also be understood that if the center leaf 14 be permitted to swing from the position shown in full line in Figure 1 to the position shown in dotted lines, an "instantaneous" exposure will have been made due to the fact that the opening 15 in the shutter leaf will have uncovered in its movement the opening 12 in the center plate 6, and the relatively large opening 10 in the diaphragm 4. Also, if the parts be left in the same position and the shutter again manipulated to throw the shutter leaf 14 back from the dotted line position to the position shown in full line, the same performance takes place, and an "instantaneous" exposure is again made.

If it is desired to make a time exposure, the operator grasps the end of the diaphragm 4, and pulls it outwardly until the downwardly extending finger 8, in the edge of the shutter plate 6 engages against the opposite end of the slot 9 in the diaphragm, or in other words, to the limit of its movement. In such position, the relatively small aperture 11 of the diaphragm will be positioned directly beneath the opening 12 in the shutter plate 6. It will now be observed that the inner end of the diaphragm 4 is turned upwardly and backwardly upon itself, as at 25, so that when the diaphragm 4 is pulled outwardly to the position shown in Figure 2, the raised backwardly turned portion 25 will overlie the shutter plate 6 and the shutter leaf 14. A lug or finger 26 is preferably struck upwardly from the edge of the shutter leaf 14, so as to engage the part 25 of the diaphragm when in the position shown in Figure 2. This upwardly-turned lug 26 is so positioned as to stop the movement of the shutter leaf 14 at the point at which the opening 15 in the leaf uncovers the openings 11 and 12 respectively. It will be understood therefore that with such an arrangement of the parts, the shutter leaf must be again operated to close the aperture after the proper length of "time" exposure has been made. With such construction, it will also be obvious that it is immaterial whether the diaphragm 4 is moved to its "time" exposure position, when the shutter leaf 14 is in a position shown in full lines in Figure 1, or in dotted lines in the same figure. In either position, the lug 26 carried by the leaf, will engage with one side or the other of the backwardly turned portion 25 of the diaphragm, and detain the leaf in its movement. This is clearly illustrated by the dotted and full line illustration of Figure 2. If after a "time" exposure has been made, it is desired to again set the shutter for "instantaneous" exposure, it is merely necessary to return the diaphragm to its position shown in Figure 1, whereupon manipulation of the shutter lever will cause the shutter leaf to be thrown completely from one side to the other of the shutter plate 6, opening and closing automatically in its movement, the aperture 12 in the shutter plate 6 and the relatively large aperture 10 in the diaphragm now positioned thereunder. In this connection, it may be explained here, that when the "time" exposure is being made, it is highly desirable, if not necessary, that the effective aperture through which the light passes to the film should be relatively small as compared to the aperture used when an "instantaneous" exposure is made. Such an arrangement permits greater depth and detail of exposure to the image than with the larger aperture and shorter exposure. It is of course necessary, however, that the larger aperture be used for "instantaneous" pictures, because a greater amount of light must be admitted in a shorter period of time.

By my construction just described, I have provided means for automatically taking care of this adjustment of the diaphragm aperture simultaneously with the setting of the shutter for "instantaneous" or "time" exposures. This makes it unnecessary for the operator to bother with adjustments which are easily forgotten. It furthermore insures that the correct adjustment will be made, this eliminating the likelihood of incorrect shutter settings by inexperienced or careless operators.

Of course many details and arrangements of parts may be changed from the form shown in the drawing and above described without departing from the spirit of the invention. I do not limit myself therefore to the exact construction herein illustrated other than by the appended claims.

I claim:—

1. A photographic shutter comprising a pivoted leaf provided with an aperture and a detent, means for swinging said leaf on its pivot, an adjustable diaphragm provided with relatively large and small apertures, and means on said diaphragm for engaging said detent when said small aperture is positioned in the path of said first mentioned aperture.

2. A photographic shutter comprising a pivoted leaf provided with an aperture, an adjustable diaphragm provided with relatively large and small apertures adapted to be selectively positioned in the path of said leaf aperture, and means on said diaphragm cooperating with said leaf for limiting the movement of said leaf when said small aperture is positioned in the path of said leaf aperture.

3. A photographic shutter comprising a pivoted leaf provided with an aperture, an adjustable diaphragm underlying said leaf and provided with relatively small and large apertures adapted to be selectively uncovered by said leaf aperture, and means on said diaphragm cooperating with means on said leaf for limiting the movement of said leaf to said uncovering position when said small aperture is in such position.

4. A photographic shutter comprising a pivoted leaf provided with an aperture, a slidable diaphragm provided with relatively large and small openings, means for selectively positioning said openings to be uncovered by said leaf aperture, and means on said diaphragm operative when said small opening is so positioned, for limiting the movements of said leaf to such uncovering position.

5. A photographic shutter comprising a pivoted leaf provided with an aperture, a slidable diaphragm with relatively large and small openings adapted to be selectively positioned to underlie said leaf aperture, and means on said diaphragm overlying said leaf and engageable with a part thereof, when said small opening is so positioned, for limiting the movement of said leaf to said uncovering position.

6. A photographic shutter comprising a pivoted leaf provided with an aperture, a slidable diaphragm underlying said leaf and provided with relatively large and small openings, one end of said diaphragm being turned back upon itself and overlying said leaf when said diaphragm is in one position, and means on said leaf for engaging said overlying part when in said position whereby the movement of said leaf is limited.

7. A photographic shutter comprising a supporting block, provided with a recess, a slidable diaphragm in said recess, a shutter plate on said block overlying said recess and diaphragm, means on said plate for limiting the movement of said diaphragm, a pivoted leaf on said plate, and means on said diaphragm for limiting the movement of said leaf in one position of said diaphragm.

CARL A. BORNMANN.